(12) United States Patent
Gaudron

(10) Patent No.: US 6,823,990 B2
(45) Date of Patent: Nov. 30, 2004

(54) NAIL HOLDER STRIP

(75) Inventor: Paul Gaudron, Stamford, CT (US)

(73) Assignee: Power Products III, LLC, New Rochelle, NY (US)

( * ) Notice: Subject to any disclaimer, the term of this patent is extended or adjusted under 35 U.S.C. 154(b) by 280 days.

(21) Appl. No.: 10/099,692

(22) Filed: Mar. 15, 2002

(65) Prior Publication Data

US 2002/0092784 A1 Jul. 18, 2002

Related U.S. Application Data

(63) Continuation-in-part of application No. 29/128,272, filed on Aug. 21, 2000.

(51) Int. Cl.[7] .............................................. B65D 85/24
(52) U.S. Cl. ...................................... 206/347; 411/443
(58) Field of Search ........................ 206/338, 343–347, 206/820; 411/441–445

(56) References Cited

U.S. PATENT DOCUMENTS

| | | | |
|---|---|---|---|
| 4,106,618 A | 8/1978 | Haytayan | |
| 4,106,619 A * | 8/1978 | Haytayan | 206/346 |
| 4,718,551 A * | 1/1988 | Whitledge | 206/347 |
| 4,881,643 A | 11/1989 | Pfister | |
| 4,932,821 A | 6/1990 | Steffen et al. | |
| 5,069,340 A | 12/1991 | Ernst et al. | |
| 5,443,345 A | 8/1995 | Gupta | |
| 5,775,514 A * | 7/1998 | Lin | 206/347 |
| 5,803,691 A * | 9/1998 | Huang | 411/442 |
| 5,836,732 A | 11/1998 | Gupta et al. | |
| D403,940 S | 1/1999 | Steinfeldt | |
| 5,865,311 A | 2/1999 | Hentges et al. | |
| D406,512 S | 3/1999 | Gardner | |
| 5,931,298 A * | 8/1999 | Huang | 206/346 |
| 5,931,622 A | 8/1999 | Gupta et al. | |
| 6,036,013 A * | 3/2000 | Chen | 206/347 |
| 6,044,972 A | 4/2000 | Rohrmoser et al. | |

* cited by examiner

*Primary Examiner*—Luan K. Bui
(74) *Attorney, Agent, or Firm*—Morgan, Lewis & Bockius LLP

(57) ABSTRACT

A nail holder strip, having a plurality of nail holders including a support base, for holding and supporting a nail, and a passage in the support base for receiving the nail. Additionally, each of the nail holders includes a stiffening stem positioned adjacent to the passage and to the support base, so as to provide additional rigidity to the strip. The plurality of nail holders are releasably attached to form the nail holder strip.

36 Claims, 2 Drawing Sheets

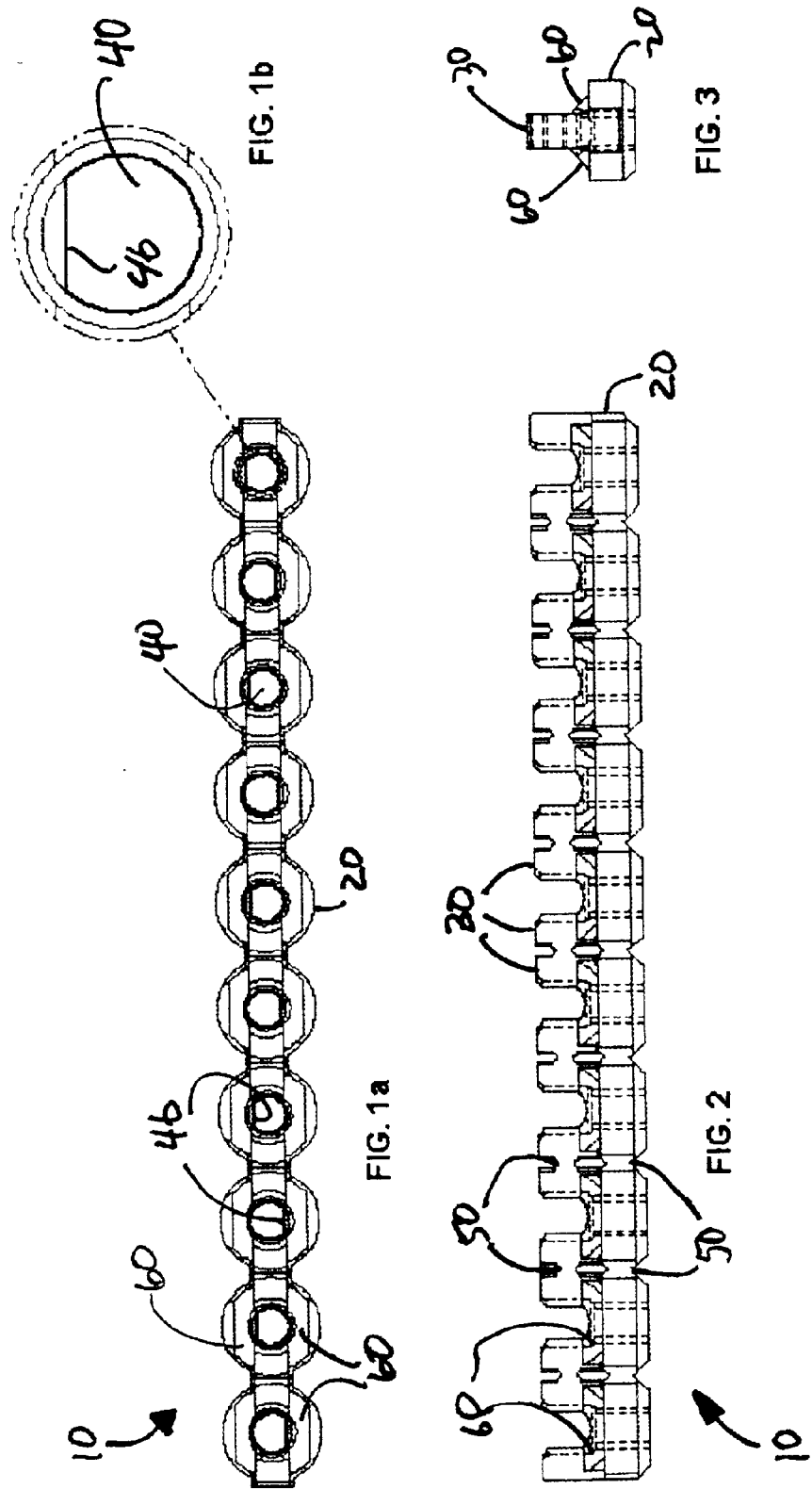

NAIL HOLDER STRIP

This is a Continuation-In-Part of Design patent application Ser. No. 29/128,272, filed Aug. 21, 2000.

BACKGROUND

1. Field of Invention

The present invention generally relates to a nail holder strip. More particularly, the present invention relates to a strip of fasteners, such as nails, pins, or other fastening devices.

2. State of the Art

There are many fastener-driving tools available on the market at present. Many of these tools are designed to utilize strips of collated fasteners, such as nails, pins and staples. Various forms of driving tools exist, such as manually, electrically, pneumatically, and combustion actuated. Typically, fasteners are designed to be driven into a workpiece or through a workpiece into a substrate.

In order to be effective, each strip includes a plurality of fasteners releasably attached to one another. Some fastener strips include molded plastic carriers, with each carrier independently attached to each individual fastener, while releasably engaged to one another. Generally each carrier is attached to another such carrier via a frangible bridge, which is broken as the fastener is driven into the workpiece. In many instances, the carrier remains attached to the fastener to act as a bushing. One of the drawbacks of this type of system is the possibility of buckling of the strip during use. To overcome this defect, the prior art has generally utilized an excessive amount of material to ensure rigidity. Increase in materials generally leads to increase in the expense of manufacture, and thereby the cost of the product. Accordingly, there is a recognized need for a more effective nail holder strip that is easy to manufacture, use, store, and at the same time economical.

OBJECTS AND SUMMARY OF THE INVENTION

Accordingly, it is an object of the present invention to provide a nail holder strip.

Another object of the present invention is to provide a nail holder strip that utilizes less material than those found on the market at present.

It is a further object of the present invention to provide a nail holder strip that is economical and easy to manufacture.

These and other objects of the present invention will be apparent in the following description.

The present invention provides a nail holder strip, having a plurality of nail holders including a support base for holding and supporting a nail, and a passage in the support base for receiving the nail. Additionally, the nail holder strip may include a stiffening stem positioned adjacent to the passage and to the support base, so as to provide additional rigidity of the strip.

In another embodiment, the present invention provides a nail holder strip, having a plurality of nail holders including a support base for holding and supporting a nail, and a passage in the support base for receiving the nail. The nail holder strip may also include a stiffening stem positioned adjacent to the passage and to the support base, so as to provide additional rigidity to the strip. A protrusion may be included within the passage so as to provide a releasable frictional hold on the nail. Additionally, the protrusion may be positioned in an opposite position in relation to the protrusion within the passage in an adjacent nail holder of the plurality of nail holders forming the nail holder strip.

In another embodiment, the present invention provides a nail holder strip, having a plurality of nail holders including a support base for holding and supporting a nail, and a passage in the support base for receiving the nail. The nail holder strip may also include a plurality of stiffening stems positioned adjacent to the passage and to the support base, so as to provide additional rigidity to the strip. In order to reinforce or stabilize the plurality of stiffening stems a single brace or a plurality of braces may be provided adjacent to the support base and at least one of the plurality of stiffening stems.

BRIEF DESCRIPTION OF THE FIGURES

FIG. 1a depicts a top view of a representative nail holder strip of the present invention.

FIG. 1b depicts an enlarged view of a passage of the nail holder of FIG. 1a.

FIG. 2 depicts a front view of the representative nail holder strip of the present invention.

FIG. 3 depicts a side view of the representative nail holder strip of the present invention.

FIG. 4 depicts an enlarged view of the nail holder of FIG. 1a.

DETAILED DESCRIPTION

Figure 4:
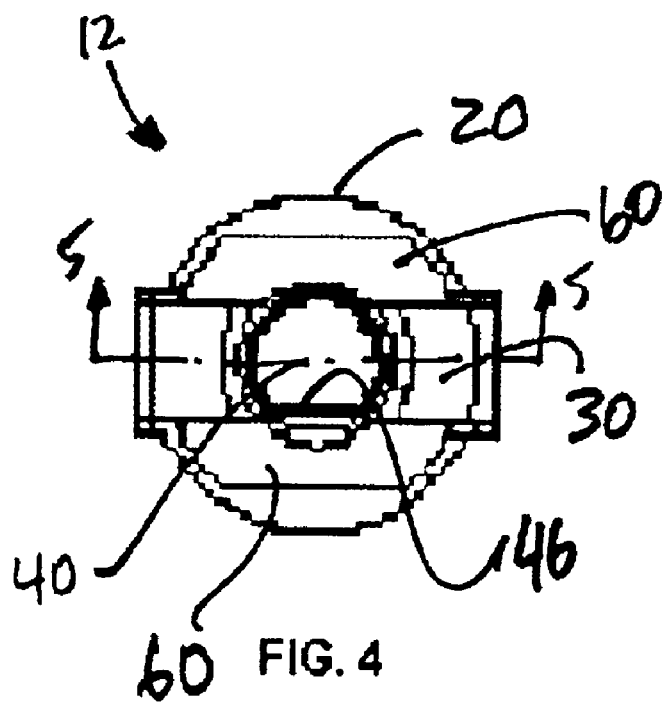

With reference now to the figures and, in particular, with reference to FIGS. 1a–3, there is depicted a representation of a nail holder strip 10 of the present invention. The nail holder strip includes a plurality of nail holders 12 (FIGS. 4 and 5), which are releasably attached to one another, as shown in FIGS. 1a and 2. The nail holders are releasably attached to one another by two bridges 50, one between adjacent base supports 20 and another between adjacent stiffening stems 30 (described below). However, it would be readily apparent to one of ordinary skill in the art, that the releasable attachment may be accomplished by other means, such as, but not limited to, a single bridge, more than two bridges, or by any other releasable attachment mechanism.

A passage 40 is provided in each nail holder for receiving a nail. However, it would be readily apparent to one of ordinary skill in the art, that the nail may be substituted by other fasteners, such as, but not limited to, pins, tacks, or staples. The passage is further provided with a protrusion 46 that extends into the passage and abuts the nail. The nail stem is held in frictional engagement within the passage, but with enough of the circumferential area of the stem remaining free from contact with the nail holder to allow for the nail to effectively slide within the passage during application. As the present invention utilized approximately 40% less material than the prior art, there is a greater risk of the strip bowing or buckling during use. In order to overcome this drawback the prior art utilizes more material to make the strip stiff, while the present invention, on the other hand, utilizes the protrusions in the passage. As shown in FIG. 1a, the protrusion may be positioned in an alternating arrangement, which helps to balance the strip as it is fed through the fastener-driving tool, and thereby avoid jamming.

Figure 5:
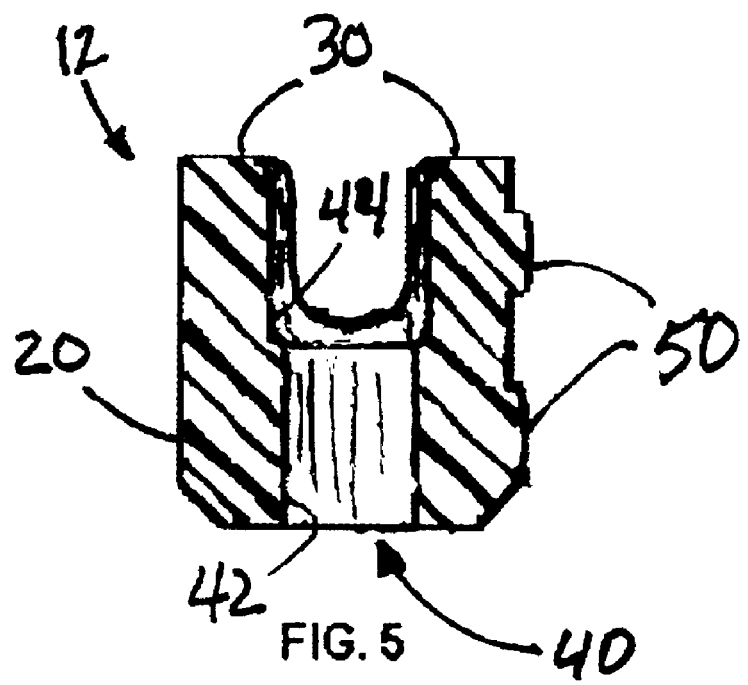
FIG. 5 depicts a cross-sectional view along line 5—5 of the nail holder of FIG. 4.

In addition to the protrusion, the passage may further include two portions with different relative diameters, as shown in FIGS. 2 and 5. A first portion 42 including the protrusion 46 extends for most of the length of the passage and is provided for frictionally engaging the nail, as described above. A second portion 44 is provided at a position nearest to the head of the nail.

Stiffening stems 30 are provided and positioned along the length of the nail for additional rigidity of the strip. The stiffening stems help to stabilize and align the strip, keeping it rigid and balanced as it is fed through the tool, and thereby aids in avoiding jamming of the tool. In order to provide for further rigidity and support, braces 60 are positioned (FIGS. 1a, 2, 3, 4) along the base of the stiffening stems and the top of the support base. The braces help to rigidly hold the stiffening stems in position to better stabilize and align the strip.

In operation the nail holder strip 10 is fed through a fastener-driving tool. As each individual nail is driven into the workpiece, the respective nail holder 12 is separated from the rest of the strip, as the force of the impact breaks the bridges 50 that connect the nail holder to the rest of the strip. Additionally, the impact of the nail as it is driven into the workpiece forces the head into the support base 20, which acts as a bushing.

While the foregoing has described and exemplified aspects of various embodiments of the present invention, those skilled in the art will recognize that alternative elements and techniques, and/or combinations and sub-combinations of the described elements and techniques, can be substituted for, or added to, the embodiments and methods described herein. The present invention, therefore, should not be limited to, or defined by, the specific apparatus, methods, and articles-of-manufacture described herein, but rather by the appended claims, which are intended to be construed in accordance with well-settled principles of claim construction, including, but not limited to, the following:

Limitations should not be read from the specification or drawings into the claims (e.g., if the claim calls for a "chair," and the specification and drawings show a rocking chair, the claim term "chair" should not be limited to a rocking chair, but rather should be construed to cover any type of "chair").

The words "comprising," "including," and "having" are always open-ended, irrespective of whether they appear as the primary transitional phrase of a claim, or as a transitional phrase within an element or sub-element of the claim (e.g., the claim "a widget comprising: A; B; and C" would be infringed by a device containing 2A's, B, and 3C's; also, the claim "a gizmo comprising: A; B, including X, Y, and Z; and C, having P and Q" would be infringed by a device containing 3A's, 2X's, 3Y's, Z, 6P's, and Q).

The indefinite articles "a" or "an" mean "one or more"; where, instead, a purely singular meaning is intended, a phrase such as "one," "only one," or "a single," will appear.

Where the phrase "means for" precedes a function, it is intended that the resulting means-plus-function element be construed to cover any, and all, implementations of the recited function using any standard techniques known by, or available to, persons skilled in the relevant art. A claim that contains more than one means-plus-function element should not be construed to require that each means-plus-function element must be a structurally distinct entity; rather, such claim should be construed merely to require that the overall combination which implements the invention must, as a whole, implement at least the functions called for by the claims

What is claimed is:

1. A nail holder strip, having a plurality of nail holders comprising:
    a support base, for holding and supporting a nail;
    a passage in said support base, for receiving said nail therethrough;
    a protrusion within said passage, so as to provide a releasable frictional hold on said nail, wherein said protrusion within said passage in at least one of said plurality of nail holders is positioned in an opposite position in relation to said protrusion within said passage in an adjacent nail holder of said plurality of nail holders forming said nail holder strip; and
    a stiffening stem positioned adjacent to said passage and to said support base, so as to provide additional rigidity to the strip;
    wherein each of said plurality of nail holders is releasably attached to form said nail holder strip.

2. The nail holder strip according to claim 1, wherein said passage is semi-circular.

3. The nail holder strip according to claim 1, wherein said protrusion includes a flat surface.

4. The nail holder strip according to claim 1, wherein said stiffening stem includes a plurality of stiffening stems positioned adjacent to said passage and to said support base.

5. The nail holder strip according to claim 4, wherein said plurality of stiffening stems are on opposite sides of said passage.

6. The nail holder strip according to claim 4, further comprising a brace adjacent to said support base and at least one of said plurality of stiffening stems, so as to reinforce or stabilize said at least one of said plurality of stiffening stems.

7. The nail holder strip according to claim 6, wherein said brace includes a plurality of braces adjacent to said support base, and said at least one of said plurality of stiffening stems, so as to reinforce or stabilize said at least one of said plurality of stiffening stems.

8. The nail holder strip according to claim 4, further comprising a breakable bridge between each of said plurality of nail holders, wherein said breakable bridge is attached to at least one of said plurality of stiffening stems.

9. The nail holder strip according to claim 1, wherein said passage includes a first portion and a second portion, and wherein said first portion and said second portion have different diameters.

10. The nail holder strip according to claim 1, further comprising a brace adjacent to said support base and said stiffening stem, so as to reinforce or stabilize said stiffening stem.

11. The nail holder strip according to claim 10, wherein said brace includes a plurality of braces adjacent to said support base and said stiffening stem, so as to reinforce or stabilize said stiffening stem.

12. The nail holder strip according to claim 1, further comprising a breakable bridge between each of said plurality of nail holders.

13. The nail holder strip according to claim 12, wherein said breakable bridge is attached to said support base.

14. A nail holder strip, having a plurality of nail holders, comprising:
    a support base, for holding and supporting a nail;
    a passage in said support base, for receiving said nail therethrough;
    a stiffening stem positioned adjacent to said passage and to said support base, so as to provide additional rigidity to the strip; and a protrusion within said passage, so as to provide a releasable frictional hold on said nail, wherein said protrusion within said passage in at least one of said plurality of nail holders is positioned in an opposite position in relation to said protrusion within said passage in an adjacent nail holder of said plurality of nail holders forming said nail holder strip;

wherein each of said plurality of nail holders is releasably attached to form said nail holder strip.

15. The nail holder strip according to claim 14, wherein said passage is semi-circular.

16. The nail holder strip according to claim 14, wherein said protrusion includes a flat surface.

17. The nail holder strip according to claim 14, wherein said stiffening stem includes a plurality of stiffening stems positioned adjacent to said passage and to said support base.

18. The nail holder strip according to claim 17, wherein said plurality of stiffening stems are on opposite sides of said passage.

19. The nail holder strip according to claim 17, further comprising a brace adjacent to said support base and at least one of said plurality of stiffening stems, so as to reinforce or stabilize said at least one of said plurality of stiffening stems.

20. The nail holder strip according to claim 19, wherein said brace includes a plurality of braces adjacent to said support base, and said at least one of said plurality of stiffening stems, so as to reinforce or stabilize said at least one of said plurality of stiffening stems.

21. The nail holder strip according to claim 17, further comprising a breakable bridge between each of said plurality of nail holders, wherein said breakable bridge is attached to at least one of said plurality of stiffening stems.

22. The nail holder strip according to claim 14, wherein said passage includes a first portion and a second portion, and wherein said first portion and said second portion have different diameters.

23. The nail holder strip according to claim 14, further comprising a brace adjacent to said support base and said stiffening stem, so as to reinforce or stabilize said stiffening stem.

24. The nail holder strip according to claim 23, wherein said brace includes a plurality of braces adjacent to said support base and said stiffening stem, so as to reinforce or stabilize said stiffening stem.

25. The nail holder strip according to claim 14, further comprising a breakable bridge between each of said plurality of nail holders.

26. The nail holder strip according to claim 25, wherein said breakable bridge is attached to said support base.

27. A nail holder strip, having a plurality of nail holders, comprising, a support base, for holding and supporting a nail;

a passage in said support base, for receiving said nail therethrough;

a stiffening stem positioned adjacent to said passage and to said support base, so as to provide additional rigidity to the strip;

a protrusion within said passage, so as to provide a releasable frictional hold on said nail;

wherein said protrusion within said passage in at least one of said plurality of nail holders is positioned in an opposite position in relation to said protrusion within said passage in an adjacent nail holder of said plurality of nail holders forming said nail holder strip; and wherein each of said plurality of nail holders is releasably attached to form said nail holder strip.

28. A nail holder strip, having a plurality of nail holders, comprising:

a support base, for holding and supporting a nail;

a passage in said support base, for receiving said nail therethrough;

a plurality of stiffening stems positioned adjacent to said passage and to said support base, so as to provide additional rigidity to the strip;

a brace adjacent to said support base, and at least one of said plurality of stiffening stems, so as to reinforce or stabilize said at least one of said plurality of stiffening stems; and a protrusion within said passage, so as to provide a releasable frictional hold on said nail, wherein said protrusion within said passage in at least one of said plurality of nail holders is positioned in an opposite position in relation to said protrusion within said passage in an adjacent nail holder of said plurality of nail holders forming said nail holder strip;

wherein each of said plurality of nail holders is releasably attached to form said nail bolder strip.

29. The nail holder strip according to claim 28, wherein said passage is semi-circular.

30. The nail holder strip according to claim 28, wherein said protrusion includes a flat surface.

31. The nail holder strip according to claim 28, wherein said plurality of stiffening stems are on opposite sides of said passage.

32. The nail holder strip according to claim 28, wherein said brace includes a plurality of braces adjacent to said support base, and said at least one of said plurality of stiffening stems, so as to reinforce or stabilize said at least one of said plurality of stiffening stems.

33. The nail holder strip according to claim 28, further comprising a breakable bridge between each of said plurality of nail holders, wherein said breakable bridge is attached to at least one of said plurality of stiffening stems.

34. The nail holder strip according to claim 28, wherein said passage includes a first portion and a second portion, and wherein said first portion and said second portion have different diameters.

35. The nail holder strip according to claim 28, further comprising a breakable bridge between each of said plurality of nail holders.

36. The nail holder strip according to claim 35, wherein said breakable bridge is attached to said support base.

* * * * *